US 6,634,459 B1

(12) United States Patent
Litkenhus et al.

(10) Patent No.: US 6,634,459 B1
(45) Date of Patent: Oct. 21, 2003

(54) ACCESSORY DRIVE AND PARTICLE TRAP

(75) Inventors: Thaddeus T. Litkenhus, Peoria, IL (US); Cornelius N. Opris, Peoria, IL (US); Craig R. Rust, East Peoria, IL (US); William L. Short, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/927,714

(22) Filed: Aug. 10, 2001

(51) Int. Cl.⁷ ................................................ F01M 1/00
(52) U.S. Cl. ...................... 184/6.12; 184/6.24; 417/201
(58) Field of Search ........................ 184/11.1, 13.1, 184/6.24, 6.12, 11.2, 11.4; 417/201

(56) References Cited

U.S. PATENT DOCUMENTS 5,768,954 A * 6/1998 Grabherr et al. .......... 74/606 R
5,879,140 A * 3/1999 Ellison ...................... 417/310

* cited by examiner

Primary Examiner—David Fenstermacher
(74) Attorney, Agent, or Firm—Steve M Hanley

(57) ABSTRACT

An accessory drive system to provide engagement between a driving input source and a driven accessory unit includes a housing attachable to the input source. A fluid suction port and a discharge port are defined by the housing and the suction port is in fluid communication with a fluid reservoir of the input source. The fluid discharge port is in fluid communication with the suction port and a gear assembly is rotatably supported by the housing. The accessory unit is operably engaged by the input source through the gear assembly and the gear assembly is structured and arranged within the housing to urge fluid away from the housing in response to movement of the gear assembly.

19 Claims, 5 Drawing Sheets

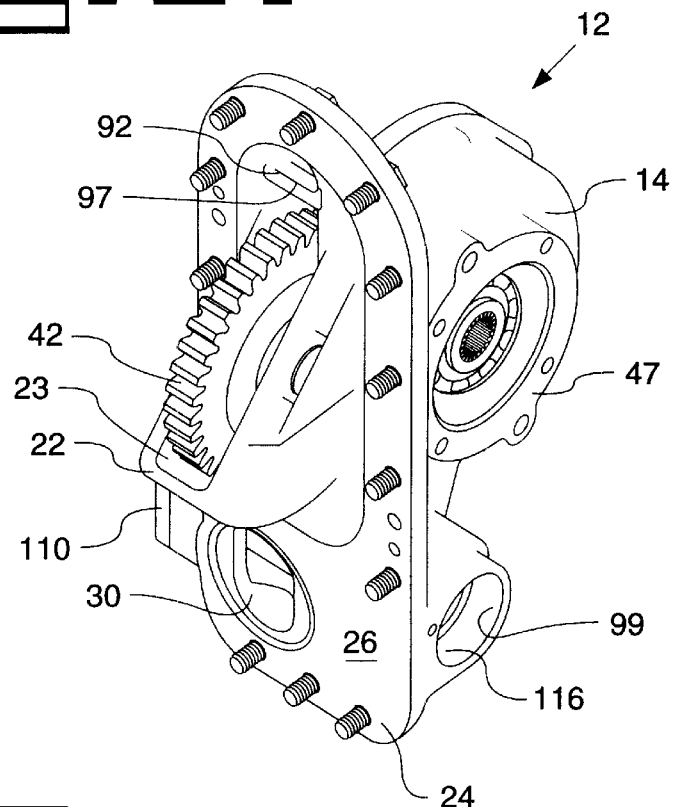
Fig_5_
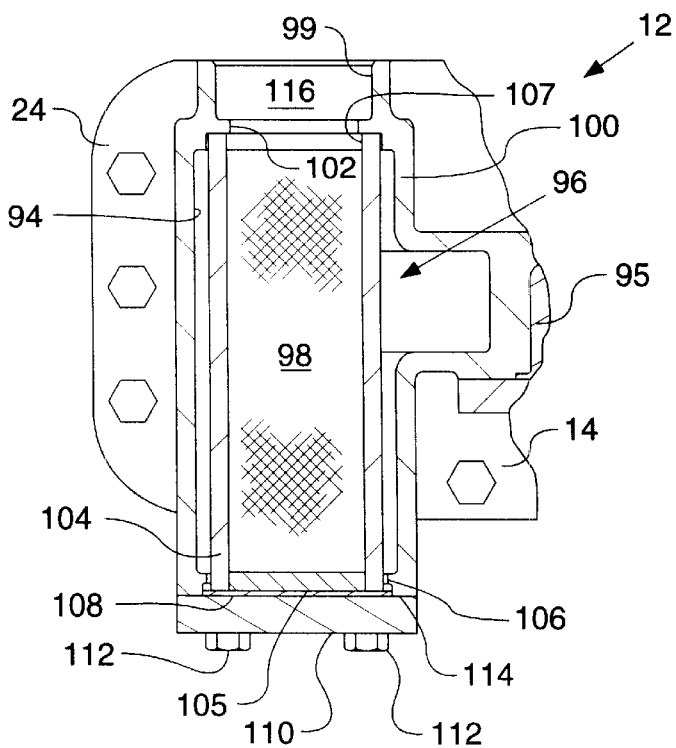
Fig_6_

ACCESSORY DRIVE AND PARTICLE TRAP

TECHNICAL FIELD

The present invention relates to a combination drive assembly and particle trap for operatively engaging a plurality of accessory units and providing filtered fluid to the accessories under a positive head condition.

BACKGROUND

Pump drive assemblies for mechanically powering an accessory pump such as a steering pump and/or implement pump are well known. One type of known pump drive assembly includes a gear assembly support housing externally mounted to a transmission casing of a transmission with the input gear of the transmission utilized to drive the pump drive assembly. The accessory pump, as it is driven by the transmission, pumps transmission fluid through a dedicated line connected between the accessory pump and a flanged suction port provided on the transmission casing. The dedicated line may include a screen assembly spliced into the dedicated line to trap particles entrained in the transmission fluid before the fluid reaches the accessory pump.

The accessory drive assembly is typically mounted on the transmission casing at a position above the fluid level in the transmission so that the fluid does not unduly restrict rotation of the drive assembly in contact with the fluid. The gears of the accessory drive assembly are often pre-lubricated, during assembly, for example, with grease so that additional lubrication by the transmission fluid is not required. If fluid does enter the accessory drive assembly housing for any reason an amount of fluid may be trapped within the accessory drive housing and become significantly elevated in temperature which is known to cause gear failure or premature wear of the gears and bearings. To avoid compromising the accessory drive assembly, the accessory drive assembly is generally positioned away from the fluid to prevent problems caused by the interaction between the stagnant fluid and the gears.

The installation of the accessory drive assembly to the transmission generally includes, first, attaching the various drive assemblies so that the accessory pump is activated corresponding to rotation of the input shaft of the transmission. Second, at least one transmission fluid line must be installed between a flange on the transmission casing, below the level of fluid contained in the transmission casing, and the flange or connector on the accessory pump. Furthermore, a particle trap or filter screen is generally introduced within the transmission fluid to ensure that particles and debris entrained in the fluid are prevented from entering the accessory pump. Hence, installing an accessory pump and drive system requires multiple components and significant labor to equip a transmission with such a system.

The present invention is directed to overcoming one or more of the problems as set forth above.

SUMMARY OF THE INVENTION

In one aspect of the present invention an accessory drive system to provide engagement between a driving input source and a driven accessory unit is provided and includes a housing attachable to the input source. A fluid suction port and a discharge port are defined by the housing and the suction port is in fluid communication with a fluid reservoir of the input source. The fluid discharge port is in fluid communication with the suction port and a gear assembly is rotatably supported by the housing. The accessory unit is operably engaged by the input source through the gear assembly and the gear assembly is structured and arranged within the housing to urge fluid away from the housing in response to movement of the gear assembly.

In another aspect of the present invention a method for operably engaging a fluid circulating accessory unit to an input source is provided and the method includes driving a gear assembly attached to the input source through a housing; circulating fluid from a reservoir to the accessory unit through the housing; and removing substantially all of the fluid entering a gear chamber of the housing through movement of the gear assembly within the housing.

BRIEF DESCRIPTION OF THE DRAWINGS

FIG. 5 is a perspective view of the accessory drive unit of FIG. 1 illustrating the idler gear and suction port;

FIG. 6 is a sectional view of the accessory drive unit of FIG. 1, taken along line 6—6 of FIG. 3, showing the particle trap assembly contained therein.

DETAILED DESCRIPTION

Figure 1:
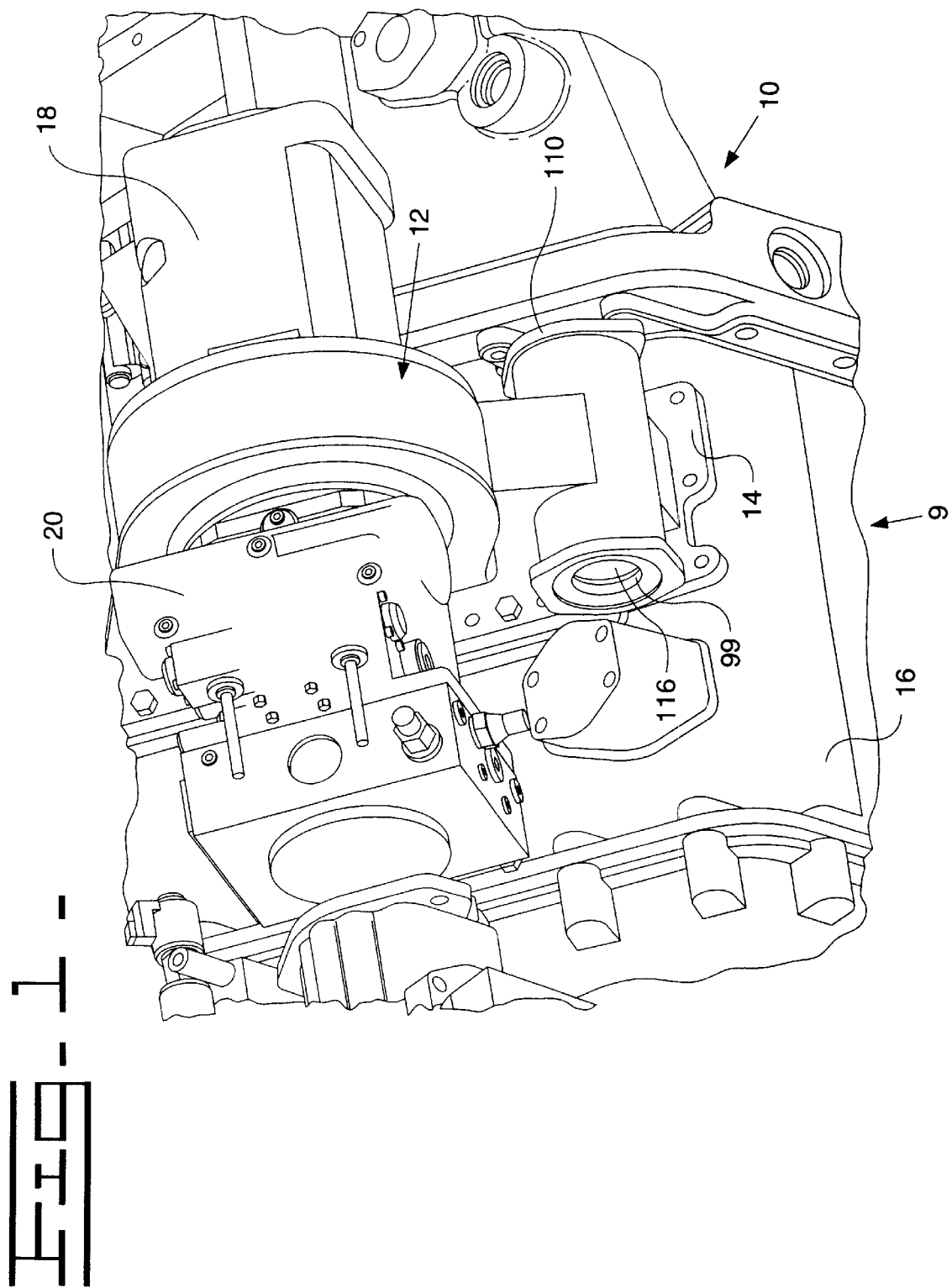
FIG. 1 is a perspective view of an accessory drive system according to the present invention.

Referring to FIG. 1, an accessory drive system 9 is shown which includes input source 10, such as transmission, for example, in driving engagement with an accessory drive assembly 12. Accessory drive assembly 12 includes housing 14 attached to casing 16 of input source 10. Accessory drive assembly 12 supports a first accessory unit 18 and a second accessory unit 20 which may be steering and implement pumps, for example.

Figure 2:
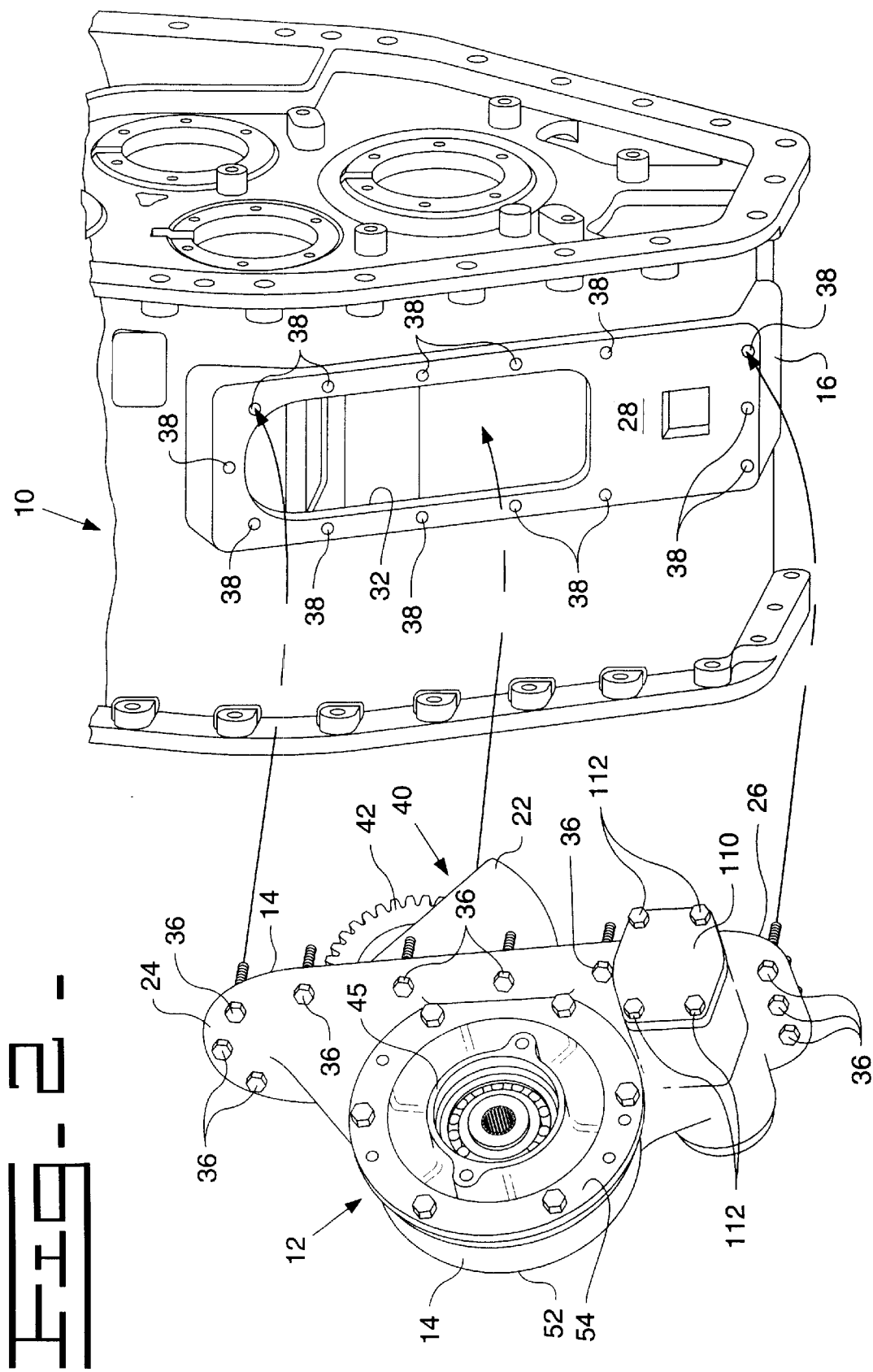
FIG. 2 is an exploded view of the input source and the accessory drive assembly of FIG. 1.
Figure 3:
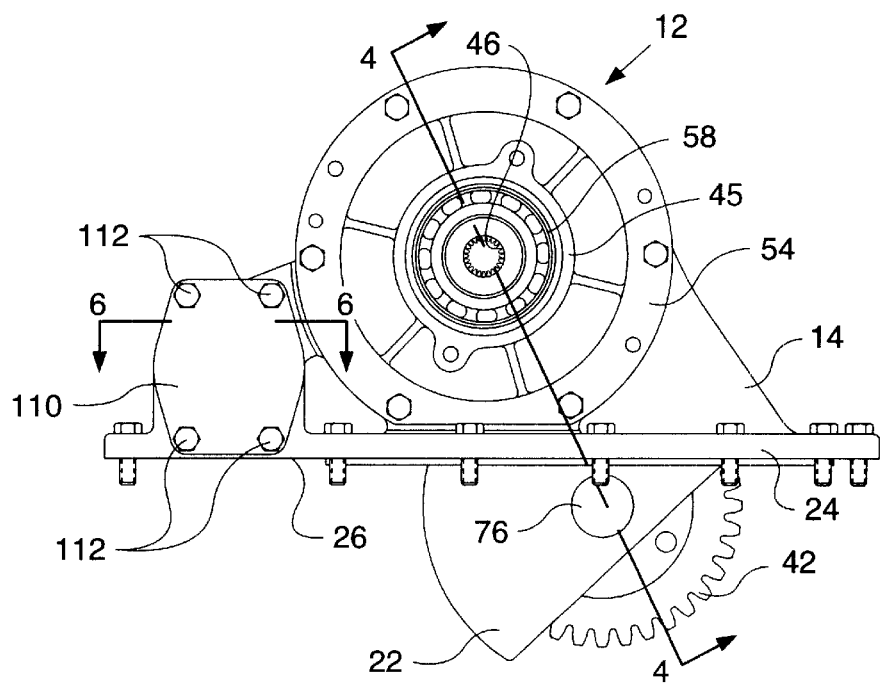
FIG. 3 is a plan view of the accessory drive unit of FIG. 1.

Referring to FIG. 2, housing 14 includes a flange portion 24 and a projecting portion 22 extended from the flange portion 24. The projecting portion 22 includes an opening 23 from which an idler gear 42 extends therefrom. Flange portion 24 includes a flange face 26 which overlays face 28 of casing 16. Projecting portion 22 extends into slot 32 within casing 16. As best shown in FIG. 5, housing 14 includes a suction port 30 which overlays port 34 extended through casing 16 of input source 10. Referring to FIG. 3, bolts 36 extend through flange portion 24 of housing 14 and engage threaded holes 38 (FIG. 2) in casing 16.

Figure 4:
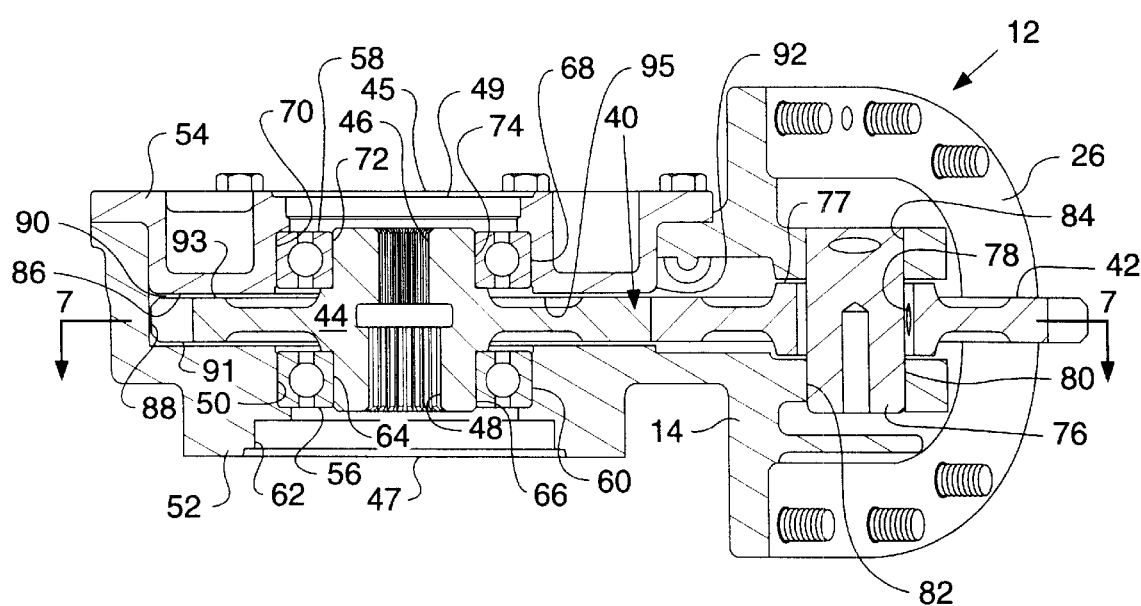
FIG. 4 is a sectional view of the accessory drive unit of FIG. 1, taken along line 4—4 of FIG. 3.

Referring to FIG. 4, accessory drive assembly 12 includes a gear assembly 40 including the idler gear 42 and an output gear 44. Idler gear 42 meshes with an input gear (not shown) enclosed within the casing 16 and is driven by the input source 10. The output gear 44 is meshed with the idler gear 42 and both output and idler gears 44, 42 are rotatably supported by the housing 14. In an exemplary embodiment, the idler gear includes thirty-six teeth and is respectively meshed with a transmission gear having thirty-five teeth and an output gear having thirty-nine teeth. As best shown in FIG. 4, output gear 44 includes a first spline portion 46 which accordingly engages with a splined shaft (not shown)

of first accessory unit 18 (FIG. 1). Similarly, a second spline portion 48 is provided in output gear 44 and accordingly engages with a splined shaft (not shown) provided by second accessory unit 20 (FIG. 1).

Referring again to FIG. 4, housing 14 includes first housing portion 52 sealably attached with housing cover 54 by conventional bolting means. Output gear 44 is rotatably supported by first housing portion 52 and housing cover 54 through respective bearing assemblies 56, 58. First bearing assembly 56 includes an outer surface 60 which is engaged by inner bore 62 of first housing portion 52. Bearing assembly 56 includes an inner surface 64 engaged by collar portion 66 of output gear 44. Similarly, second bearing assembly 58 includes an outer surface 68 engaged by inner bore surface 70 of housing cover 54. Bearing assembly 58 includes an inner surface 72 engaged by collar portion 74 of output gear 44.

Idler gear 42 is rotatably supported by housing 14 as hereinafter described. Pin 76 and bearing 77 extend through hole 78 in idler gear 42 to generally center gear 42 about outer surface 80 of pin 76. Pin 76 is accordingly sized in relation to holes 82, 84 within housing 14 to hold pin 76 stationary as idler gear 42 rotates thereabout.

Figure 7:
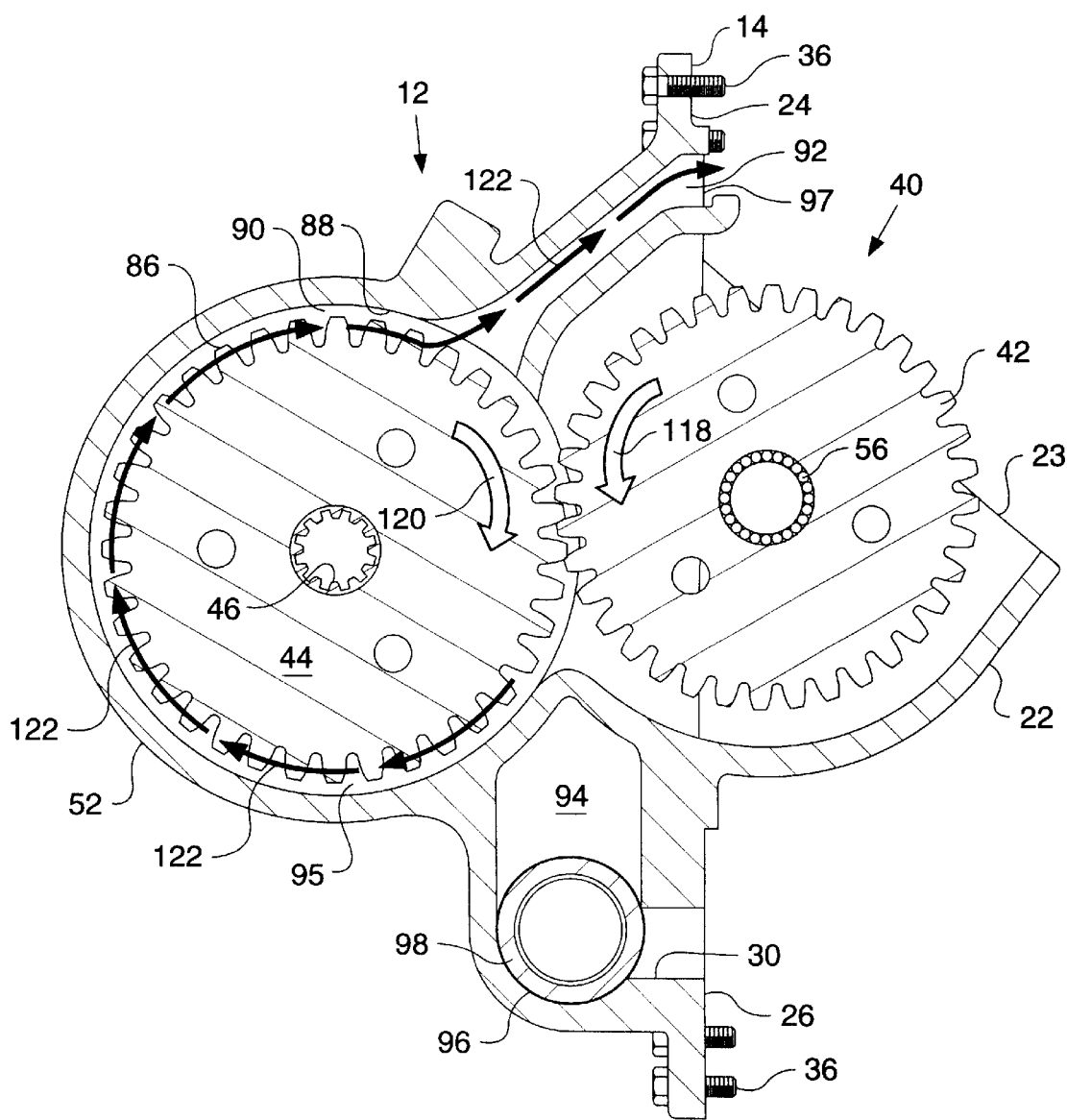
FIG. 7 is a sectional view of the accessory drive unit of FIG. 1, taken along line 7—7 of FIG. 4, showing the gear assembly within the housing.

Referring to FIGS. 4 and 7, output gear 44 includes a periphery portion 86 which is closely arranged with an inner surface 88 of housing 14, forming clearance 90 therebetween. Clearance 90, which may also be referred to as a "draft", uniformly extends along each lateral surface 91, 93 and along the periphery portion 86 of output gear 44 within a gear chamber 95 of housing 14. In an exemplary embodiment, clearance or draft 90 may be 1.5 mm, for example. A discharge chute 92 is provided radially outside output gear 44 within the housing 14 which receives fluid purged from gear chamber 95 of housing 14 by output gear 44 as hereinafter described. An opening 97 is provided in flange 24 of housing 14 so that fluid directed through discharge chute 92 may exit the accessory drive assembly 12 (FIG. 7).

As best shown in FIG. 4, the accessory units 18, 20 (FIG. 1) respectively mount to faces 45, 47 of housing 14. Housing 14 includes a pair of intake openings 49, 50 which respectively receive fluid from the accessory units 18, 20.

Referring to FIG. 6, a particle trap assembly 96 is provided within suction chamber 94 of housing 14 to trap particles and debris entrained within the fluid entering the accessory drive assembly 12 from a fluid reservoir (not shown) formed within the casing 16. The particle trap assembly 96 may include a cylindrical screen assembly 98 which is impregnated, circumferentially along portions of each end 100, 104 with a resilient elastomer or other screen-to-casting-seal structure known to those having ordinary skill in the art. Furthermore, it is envisioned that the screen assembly 98 may be made of an alternative material such as corrugated cellulose, for example, or any other alternative material known to those having ordinary skill in the art.

Screen assembly 98 includes end 100 projecting into, and circumferentially sealed within, counterbore 102 of housing 14. Similarly, end 104 of screen assembly 98 engages circumferential rim portion 106 of housing 14. End 104 of screen assembly 98 includes end wall 105 which encloses end 104 and is preferably constructed of either the filter material itself or by the seal extending over end 104 of the screen assembly 98. In contrast, end 100 of screen assembly 98 includes opening 107 to allow the clean fluid, which has passed through the screen assembly, to pass through the discharge port 99 and be accordingly directed to the accessory units. A retaining member 108, such as a wave spring or arched retaining ring, for example, is positioned between end wall 105 of screen assembly 98 and a service cover 110 to secure the screen assembly 98 such that it is sealed within suction chamber 94 of housing 14. Cover 110 is sealed to housing 14 through an O-ring seal 114 and is secured to housing 14 by fasteners 112 (FIG. 3).

Referring to FIGS. 1 and 5, discharge port 99 includes an inner surface 116, preferably machined, to sealably receive a tube end (not shown) fitted with an O-ring seal (not shown) to form a conventional pipe-to-port, or "slip-joint" type sealing arrangement. Alternatively, it is envisioned that the pipe may include an integral flange which may abuttingly interface with a complementary flange provided by the housing, such as a four-bolt flange for example. Accordingly, fluid passing through discharge port 99 is directed to respective charge pumps (not shown) fluidly connected to accessory units 18, 20 (FIG. 1).

Industrial Applicability

Referring to FIG. 2, in an exemplary embodiment accessory drive system 9 is driven by input source 10 which may be a transmission including a rotatable drive gear (not shown) meshed with idler gear 42 which urges rotation of output gear 44 (FIG. 7). The transmission includes a reservoir having a level of fluid contained within casing 16 which is generally above the port 34 within casing 16. Since the port 34 is generally below the level of fluid within the casing, the fluid flows into, and is continuously present within, the suction chamber 94 of the housing 14. Fluid enters the gear chamber 95 from the accessory units 18, 20 through intake openings 49, 50 within the housing 14 (FIG. 4).

Referring to FIG. 7, operation of the gear assembly 40 will now be described. Accessory units 18, 20 (FIG. 1) direct fluid to the gear assembly 40 through bearing assemblies 56, 58 (FIG. 4 and FIG. 7, however only bearing assembly 56 is shown in FIG. 7) rotatably supporting idler gear 42. As the fluid travels through the bearings and across the idler gear, the fluid is urged from the idler gear to the output gear. The respective rotational motion of the idler and output gears is shown by arrows 118, 120. Fluid may enter opening 23 in projecting portion 22 of housing 14, possibly subjecting gear 42 to partial immersion in fluid, however it is envisioned that the gear assembly 40 would be effective to remove even significant amounts of fluid which may have entered into housing 14.

Since the output gear 44 is closely fitted within the gear chamber 95 substantially all of the fluid entering the gear chamber 95 is urged out of the gear chamber 95 by the output gear 44. Arrows 122, which are in proximity to the periphery portion 86 of the output gear 44, indicate the fluid path as fluid passes through the gear chamber 95. It may be seen that the fluid moves through the discharge chute 92 and exits the accessory drive assembly 12 through discharge opening 97. The output gear 44 urges fluid away from the accessory drive assembly and back into the transmission casing 16 through the discharge chute 92 and then through the opening 97 within projection portion 22 of housing 14. As a result, an insignificant amount of fluid resides within the housing, and consequently, the input and idler gears experience little if any resistance due to fluid.

Since the suction port 30 (FIG. 5) of the housing 14 is submersed in fluid within the fluid reservoir and generally below a fluid level of the reservoir, a positive fluid pressure or "head" is established at the site of the input of the accessory unit (not shown). As a result, a positive head is experienced by accessory units which increase the performance, controllability and responsiveness of the accessory units.

Other aspects, objects and advantages of the invention can be obtained from a study of the drawings, the disclosure and the appended claims.

What is claimed is:

1. An accessory drive system to provide engagement between a driving input source and a driven accessory unit, the accessory drive assembly comprising;
    a housing attachable to the input source;
    a fluid suction port defined by said housing and being in fluid communication with a fluid reservoir of the input source;
    a fluid discharge port defined by said housing and in fluid communication with said suction port;
    a gear chamber defined by said housing;
    a gear assembly rotatably supported by said housing, the accessory unit being operably engaged by said input source through said gear assembly, said gear assembly structured and arranged within said housing to urge fluid away from said housing and in response to movement of said gear assembly; and
    a portion of said housing being in an overlaying relation with a periphery of a first gear of said gear assembly to cause directed movement of fluid therebetween and other portions of said housing being in spaced relation to a second gear of said gear assembly;
    wherein fluid is purged from said gear chamber through movement of said first gear.

2. The accessory drive system of claim 1, wherein said gear assembly includes at least one gear substantially superimposed by said housing such that substantially all the fluid entering said housing is purged from said housing through movement of said at least one gear.

3. The accessory drive system of claim 1, wherein said housing includes a discharge chute and fluid is transported away from said housing through said discharge chute.

4. The accessory drive system of claim 1, further comprising a particle trap assembly removable disposed in said housing wherein substantially all fluid circulated from said fluid reservoir to said accessory is directed through said particle trap assembly.

5. The accessory drive system of claim 4, wherein the particle trap assembly includes a screen assembly positioned between said fluid suction port and said fluid discharge port of said housing.

6. The accessory drive system of claim 4, wherein said particle trap assembly is externally removable through a cover member positioned on said housing.

7. The accessory drive system of claim 4, wherein said housing, gear assembly and said particle trap assembly define a sub-assembly externally attachable to a casing of the input source.

8. The accessory drive system of claim 1, wherein the input source is a transmission.

9. The accessory drive system of claim 2, wherein said gear assembly includes a second gear drivingly coupled to said input source and engagingly coupled to said at least one gear.

10. The accessory drive system of claim 2, wherein said housing includes a flange portion disposed between the accessory unit and said input source.

11. The accessory drive system of claim 10, further comprising a second accessory unit, said accessory unit and said second accessory unit are directly drivingly engaged with said at least one gear.

12. The accessory drive system of claim 1, wherein the accessory unit is operative to circulate fluid from said fluid reservoir to said housing and in response to movement of said gear assembly substantially all of said circulated fluid being urged away from said housing.

13. The accessory drive assembly of claim 1, wherein at least a portion of said housing is submersed in said fluid reservoir.

14. The accessory drive assembly of claim 13, wherein a fluid intake of the accessory input is subject to a positive fluid pressure in response to said suction port of said housing being submersed in fluid contained within said fluid reservoir.

15. A method for operably engaging a fluid circulating accessory unit to an input source, the method comprising;
    driving a gear assembly attached to the input source through a housing;
    circulating fluid from a reservoir to the accessory unit through an overlaying relationship between a portion of the housing and a gear of the gear assembly; and
    removing substantially all of the fluid entering a gear chamber of the housing through movement of the gear assembly within the housing through the overlaying relationship between a portion of the housing and a gear of the gear assembly.

16. The method of claim 15, wherein the accessory unit is directly mounted to the housing.

17. The method of claim 15, wherein at least a portion of the housing is submersed in fluid contained within a fluid reservoir within the input source.

18. The method of claim 15, further comprising directing the fluid through a particle trap assembly disposed within the housing and between a suction port and a discharge port within the housing.

19. The method of claim 18, further comprising the steps of forming a pre-assembly comprising the housing, the gear assembly and the particle trap assembly and attaching the pre-assembly with the input source.

* * * * *